US009857004B2

(12) United States Patent
Coeffe et al.

(10) Patent No.: US 9,857,004 B2
(45) Date of Patent: Jan. 2, 2018

(54) THREADED CONNECTION AND PROCESS FOR OBTAINING IT

(75) Inventors: Guillaume Coeffe, Paris (FR); Celine Sches, Famars (FR)

(73) Assignees: VALLOUREC OIL & GAS FRANCE, Aulnoye-Aymeries (FR); NIPPON STEEL & SUMITOMO METAL CORPORATION, Tokyo (JP)

( * ) Notice: Subject to any disclaimer, the term of this patent is extended or adjusted under 35 U.S.C. 154(b) by 1390 days.

(21) Appl. No.: 13/704,358

(22) PCT Filed: Jun. 1, 2011

(86) PCT No.: PCT/EP2011/002707
§ 371 (c)(1),
(2), (4) Date: Dec. 14, 2012

(87) PCT Pub. No.: WO2011/157359
PCT Pub. Date: Dec. 22, 2011

(65) Prior Publication Data
US 2013/0093185 A1 Apr. 18, 2013

(30) Foreign Application Priority Data
Jun. 17, 2010 (FR) .................................... 10 02563

(51) Int. Cl.
*F16L 15/00* (2006.01)
*E21B 17/043* (2006.01)

(52) U.S. Cl.
CPC ............ *F16L 15/00* (2013.01); *E21B 17/043* (2013.01); *F16L 15/004* (2013.01); *Y10T 29/49826* (2015.01)

(58) Field of Classification Search
USPC ................................. 285/333–334, 355, 390
See application file for complete search history.

(56) References Cited

U.S. PATENT DOCUMENTS 3,355,192 A * 11/1967 Kloesel, Jr. ........... E21B 17/042
285/334
4,067,596 A * 1/1978 Kellner ................. E21B 17/042
175/215

(Continued)

FOREIGN PATENT DOCUMENTS

CN 101438089 A 5/2009
CN 101449023 A 6/2009

(Continued)

OTHER PUBLICATIONS

Office Action dated Nov. 4, 2014 in Japanese Patent Application No. 2013-514571 (submitting English language translation only).

(Continued)

*Primary Examiner* — Aaron Dunwoody
*Assistant Examiner* — Fannie Kee
(74) *Attorney, Agent, or Firm* — Oblon, McClelland, Maier & Neustadt, L.L.P.

(57) ABSTRACT

A female component for a tubular hydrocarbon working string subjected to dynamic bending strength includes a tapered female threading cooperating with a male threading to form a rigid mutual connection of tubular elements, a free end and female sealing surface disposed between the free end and the female threading, the female sealing surface to contact in a made up condition with a male sealing surface to form a metal-metal seal, and an annular groove provided between the free end and the female sealing surface, leaving an axial distance greater than zero between the free end and a transition region outwardly of the female sealing surface, and a radial distance greater than zero between the female sealing surface and a chamfer at the free end, the groove including borders formed by the chamfer and a portion of the transition region protecting the female sealing surface prior to makeup.

16 Claims, 1 Drawing Sheet

(56) References Cited

U.S. PATENT DOCUMENTS

| | | | |
|---|---|---|---|
| 4,153,283 A | | 5/1979 | Hellmund et al. |
| 4,494,777 A | * | 1/1985 | Duret .................... E21B 17/042 285/334 |
| 4,611,838 A | * | 9/1986 | Heilmann ............. E21B 17/042 285/331 |
| 4,706,997 A | * | 11/1987 | Carstensen ........... E21B 17/042 285/13 |
| 4,770,448 A | * | 9/1988 | Strickland ............. E21B 17/042 285/333 |
| 4,846,508 A | * | 7/1989 | Pallini, Jr. ............. E21B 17/085 285/148.19 |
| 4,865,364 A | * | 9/1989 | Nobileau .............. F16L 15/003 285/333 |
| 4,903,992 A | * | 2/1990 | Jennings ................ E21B 17/06 285/123.4 |
| 5,360,239 A | * | 11/1994 | Klementich .......... F16L 15/001 285/328 |
| 5,423,579 A | | 6/1995 | Blose et al. |
| 6,543,816 B1 | * | 4/2003 | Noel ................... E21B 17/0423 285/332.4 |
| 6,752,436 B1 | | 6/2004 | Verdillon |
| 7,506,900 B2 | * | 3/2009 | Carcagno ............. F16L 15/004 285/333 |
| 2002/0027363 A1 | | 3/2002 | Mallis et al. |
| 2004/0084901 A1 | * | 5/2004 | Church ............... E21B 17/0423 285/333 |
| 2007/0176424 A1 | | 8/2007 | Nobileau |
| 2008/0012321 A1 | | 1/2008 | Roussie |
| 2009/0008087 A1 | | 1/2009 | Vladimirovich Getman et al. |
| 2010/0181763 A1 | | 7/2010 | Mallis et al. |
| 2011/0037255 A1 | | 2/2011 | Roussie |

FOREIGN PATENT DOCUMENTS

| | | |
|---|---|---|
| DE | 693 18 398 T2 | 11/1998 |
| EP | 1 046 779 | 10/2000 |
| FR | 2 807 095 | 10/2001 |
| FR | 2 863 681 | 6/2005 |
| FR | 2 868 146 | 9/2005 |
| FR | 2 880 097 | 6/2006 |
| GB | 2 116 276 A | 9/1983 |
| JP | 53-36024 | 4/1978 |
| JP | 58-152994 A | 9/1983 |
| JP | 60-500458 A | 4/1985 |
| JP | 4-66484 U | 6/1992 |
| JP | 7-63289 A | 3/1995 |
| WO | WO 85/02651 | 6/1985 |
| WO | WO 2005/111367 A1 | 11/2005 |

OTHER PUBLICATIONS

International Search Report dated Aug. 17, 2011 in PCT/EP11/02707 Filed Jun. 1, 2011.

* cited by examiner

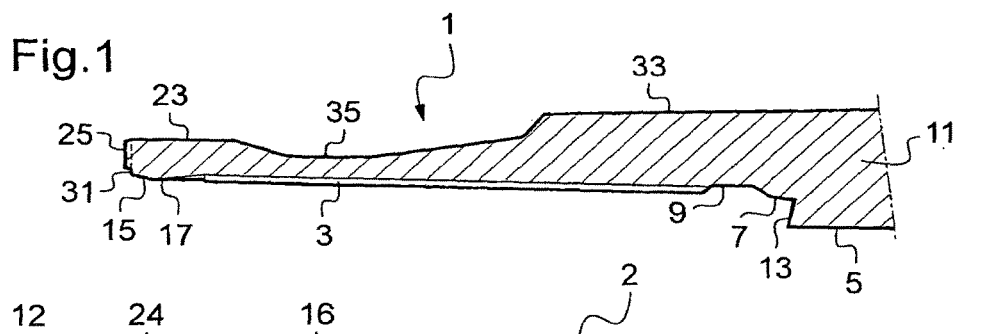
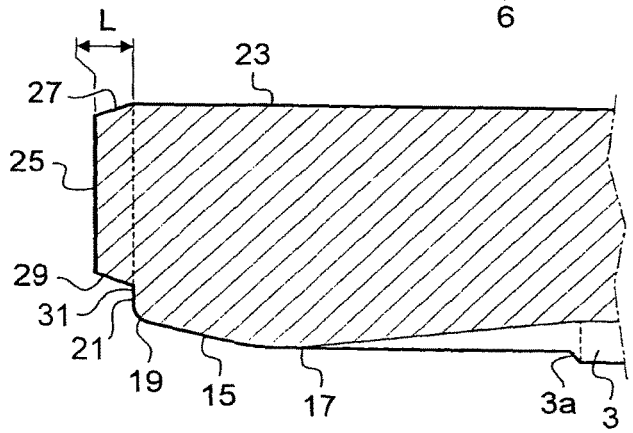
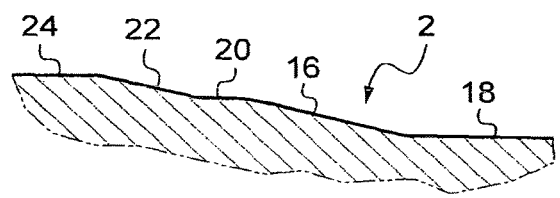
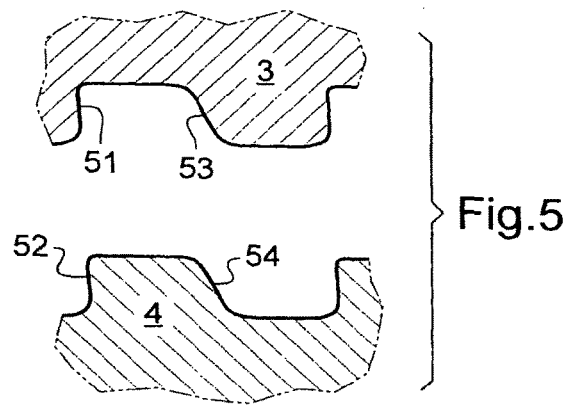

THREADED CONNECTION AND PROCESS FOR OBTAINING IT

Female component for tubular hydrocarbon working string, threaded connections and process for obtaining it.

The invention relates to a female component of threaded tubular connections for an oilfield working string subjected to dynamic bending strength. The female component complements a male component with cooperation by makeup.

That type of threaded connection is in particular intended for the production of strings of tubes for hydrocarbon wells or similar wells between a platform and a well formed in a sea bottom.

In addition to relatively constant axial tensile loads, the action of waves, wind, tides and ocean currents subject strings of tubes connecting offshore platforms to the sea bottom to variable bending strength. Said strength is transmitted from one tube to another of the string via the threaded connections.

The tightness of a threaded connection is generally provided by means of sealing surfaces located outside the zone of the threadings and forming a metal-metal seal.

The document WO 85/02651 proposes radially thickening one end of the female element inwardly in order to protect the sealing surface thereby. However, the thickened region, which interrupts the taper with the aid of a cylindrical surface at the internal peripheral surface of the female element, severely risks damaging the male sealing surface during makeup. Furthermore, the thickened region tends to stiffen the end of the female element too much.

Following tests, the Applicant has observed that such components are also prone to deterioration of the female sealing surface during manipulation by operators, in particular during their positioning prior to makeup.

The Applicant has also observed that a component designed to resist dynamic bending stresses should retain those properties until the components are used. In other words, the component must be protected during its transport, during its manipulation with a view to makeup and during contact between a male component and a female component. A disposable cap may be used, but its purchase price, positioning costs at the end of manufacture, removal costs and recycling costs are not satisfactory. A reduction in the quantity of material to be recycled and a simplification of the operations that have to be carried out manually has to be developed. To this end, the Applicant has conceptualized a bumper axially disposed between a female sealing surface and the free end of the female component. The term "free end" means a terminal surface of a female component which is constructed to remain at an axial distance from a corresponding male component. The bumper can then accommodate various mechanical challenges that could even distort it slightly while the sealing properties of the connection are preserved.

The invention is intended to improve the situation by improving the protection of the female sealing surface.

The female component for tubular hydrocarbon working strings subjected to dynamic bending strength comprises a tapered female threading for cooperation with a male threading in order to form a rigid mutual connection of tubular elements, a free end and a female sealing surface being disposed between the free end and the female threading. The female sealing surface is intended to come into contact in the made up condition with a male sealing surface in order to form a metal-metal seal. The component comprises an annular groove provided between the free end and the female sealing surface. The annular groove leaves an axial distance between the free end and a transition region outwardly of the female sealing surface, and a radial distance between the female sealing surface and a chamfer of the free end, so as to protect the female sealing surface prior to makeup.

In other words, with respect to the free end, the female sealing surface is substantially set back by at least said axial distance. The set back female sealing surface is thus less exposed to shocks, with the free end acting as a bumper. Since said free end is intended to remain free, even in the made up condition, it can be subjected to a variety of shocks while preserving the sealing properties of the female sealing surface. Since the free end is provided with a chamfer on the side of the groove, the sealing surface of the male component remains at a distance from surfaces other than the sealing surface of the female component.

Further, the material of the female component between the free end and a radial plane passing through the transition region can also contribute to the radial stiffness of the female sealing surface. More particularly, the Applicant has observed that the female component of the invention has a remarkable property: there is a correlation between said axial distance and the position along the axis of the female component of the contact zone of a male sealing surface with the female sealing surface having maximum contact pressure. Thus, with all other features being equal, the axial position of the maximum contact pressure zone can be adjusted by acting on said axial distance. Thus, modification of the geometrical characteristics of the male and female sealing surfaces, the characteristics of the threadings and more generally the geometrical characteristics of the elements located to the side of the radial plane passing through the transition region opposite to the free end of the female component can be avoided.

In one embodiment, the component comprises an abutment. The abutment may be internal. The abutment may be disposed opposite to the free end with respect to the female threading.

In another embodiment, the abutment function is ensured by self-locking threadings (the pitch of the stabbing flanks is constant and smaller than the pitch of the load flanks which is also constant). During the final makeup phase, the flanks of the male and female components come into tightening contact against each other in order, over the whole length of the threading, to provide a total contact pressure equivalent to that which is supported by the internal abutment.

In one embodiment, the chamfer is tapered.

In one embodiment, the free end comprises a surface with a generally radial form.

In one embodiment, a portion of the transition region is in the general form of a circular arc in axial section. The female sealing surface may have the general form of a circular arc in axial section. The radius of the female sealing surface may be greater than 150 mm, preferably greater than 180 mm. The radius of the female sealing surface may be greater than at least five times the radius of the portion of the transition region, preferably at least ten times.

In another embodiment, a portion of the transition region has the general form of a circular arc in axial section and the female sealing surface is tapered.

In one embodiment, the female sealing surface blends into the female threading via a surface which is generally cylindrical in form. The female threading may have an envelope which is tangential to said surface with a generally cylindrical form.

In one embodiment, the female sealing surface has a mean inclination which is less than the inclination of said chamfer, preferably by at least 10%.

In one embodiment, the female sealing surface has a mean inclination of more than 35%, preferably 45%, for example approximately 50%.

In one embodiment, the female tubular element comprises a chamfer between the free end and an external surface of the female tubular element.

In one embodiment, the female tubular element comprises a zone with a low thickness at the female threading and a zone with a high thickness at the female sealing surface. The low thickness zone may extend over a portion of the length of the female threading. The low thickness zone may be obtained by providing a concavity in axial section from the external surface of the female tubular element.

In one embodiment, the axial distance between the free end and a transition region outwardly of the female sealing surface is greater than 1 mm. The radial distance between the female sealing surface and a chamfer of the free end may be more than 1.5 mm.

In one embodiment, the female threading comprises roots, crests, load flanks and stabbing flanks connected via fillets with two radii of curvature, a large radius of curvature close to the roots and crests and a small radius of curvature close to the load flanks and the stabbing flanks.

In one embodiment, the female threading comprises substantially radial load flanks and the stabbing flanks comprise a small diameter portion with a tapered form and a large diameter portion which is concave, which are rounded in form in axial section with transition between the large diameter portion and the small diameter portion via a convex connecting fillet.

In one embodiment, the female threading and the male threading are self-locking in the radial direction.

In one embodiment, the female tubular component forms part of a tube with two female components. This type of tube is generally short, for example less than 1 meter, and termed a coupling. Such a coupling may act to connect two tubes provided with corresponding male ends.

The invention also envisages a threaded connection comprising a female component as described above and a male tubular component comprising a tapered male threading, a male sealing surface and an external cylindrical surface the diameter of which is a maximum for the male tubular component. The male sealing surface may be disposed between the male threading and the external cylindrical surface. A ramp may be provided close to the external cylindrical surface. A cylindrical inspection surface may be provided between the ramp and the tapered sealing surface.

In one embodiment, the manufacture of a threaded connection as described above comprises a step in which machining of the male sealing surface is inspected by verifying that the cylindrical inspection surface has been machined. The cylindrical inspection surface has a diameter at least equal to that of the male sealing surface; machining of the inspection surface, and in particular its circumference, shows that the machining tool has machined to diameters of less than the diameters of the cylindrical inspection surface.

The invention also provides a process for obtaining a female component as described above, in which a location of maximum pressure to which the female sealing surface in contact with a male sealing surface is subjected is selected as a function of the axial distance between the free end and the outward transition region of the female sealing surface.

Because of the invention, the female sealing surface of the female component of a threaded connection is particularly well protected against challenges or external shocks before making it up. This protection, forming an integral part of the female component, can avoid the use of a removable protection, for example produced from synthetic materials having the form of plugs or caps which are occasionally used then discarded when the tubes are connected. This reduces the quantity of used material to be recycled. The female sealing surface is also better protected against a shock from a male component provided for engagement with the female component. Finally, the location of the maximum pressure being exerted on the female sealing surface can be adjusted over a certain path by selecting the axial distance between the free end and the transition region. Said axial distance has relatively little influence on the other parameters and thus offers a simple and cheaply implemented means of adjustment, avoiding having to design a new connection simply to achieve the desired displacement of the location of maximum pressure.

The characteristics and advantages of the invention are disclosed in more detail in the following description, given by way of non-limiting example with reference to the accompanying drawings in which:

FIGS. 1 and 2 are axial sectional views of male and female components in accordance with one embodiment;

FIGS. 3 and 4 are detailed views of FIGS. 1 and 2; and

FIG. 5 is a partial axial sectional view of the threadings of the female and male components of FIGS. 1 and 2.

The accompanying drawings not only serve to complete the invention, but also where necessary contribute to its definition.

Let us consider the working of wells, in particular hydrocarbon wells at sea. Between the well bored into the sea bed and the platform located above at the highest point of the sea, a string of tubes extends which is not only subjected to the stresses normally encountered for strings of tubes of land-based wells, such as compression, tension, etc, but also to the stresses exerted by the sea such as marine currents, swells, wind and vibrations of the platform. These stresses generally result in static and/or dynamic bending of the tube string. The bending stress is exerted, inter alia, on the connection between two tubes. Thus, the threadings are particularly loaded as they are subjected to the bending moment in addition to the axial load. There is a risk of generating the beginnings of fatigue cracking of the threadings, in particular the last male threads. These dynamic stresses also cause friction between the portions of the male and female components in contact, resulting in fretting fatigue. Reference should be made to document FR 2 868 146 which proposes transferring part of the bending moment via a transfer zone at a distance from the threadings.

Further, the risk of disengagement or jump-out of the tubular components in service should advantageously be protected against. Reference should be made to the document FR 2 863 681.

The Applicant has observed that a component designed to resist dynamic bending loads must preserve such properties until the components are used. In other words, the component must be protected during its transport, during its manipulation for makeup and when a male component and a female component are being brought into contact. A disposable cap may be used, but its purchase price, transport cost after manufacture, removal then recycling costs are not satisfactory. The quantity of material to be recycled should advantageously be reduced and the operations to be carried out manually should be simplified. To this end, the Applicant has conceptualized a bumper axially disposed between a female sealing surface and a free end of the female component. The term "free end" means a terminal surface of a female component which is intended to remain at an axial distance from a corresponding male component. The bumper can then accommodate various mechanical challenges which could even slightly deform it while preserving the sealing properties of the connection.

The tubular threaded connection represented in FIGS. 1 and 2 comprises a female tubular element 1 and a male tubular element 2 provided with respective tapered threadings 3, 4, which cooperate for mutual connection of the two elements by makeup. The female element 1 is formed at one end of a tubular coupling 11 intended to connect two great length tubes; the male element 2 at one end of a great length tube 12 is intended to be connected via two couplings such as 11. A plurality of tubes 12, each having two threaded elements 2 at its two ends, may thus be connected together via couplings 11, each having two female threaded ends 1 at its two ends, in order to form a string of tubes which, for example, equips an oil well.

In the case illustrated, between these two male elements, i.e. on the major portion of its length, termed the regular portion, the tube 12 has a uniform external diameter, for example of 533.4 mm (21 inches), which represents the nominal diameter of the threaded connection. The values for the dimensions given below are based on this nominal diameter, but may differ therefrom.

The threaded connection comprises an internal seal located between the threadings 3, 4 and the respective bores 5, 6 of the coupling 11 and tube 12. The internal seal is provided by contact between a female sealing surface 7, for example tapered, in contact in the made up condition, with a male sealing surface 8, for example tapered or dished. The inclination of the female sealing surface 7 may be in the range 25% to 75%, preferably in the range 40% to 60%, for example approximately 50%. In the case illustrated, the mean inclination of the male sealing surface 8 is equal to the inclination of the female sealing surface 7.

An annular groove 9 is provided in the female element 11 between the threading 3 and the female sealing surface 7. The groove 9 comprises a tapered bottom. Said bottom may have an inclination equal to that of the threading 3. Said bottom may be set back with respect to the thread roots of the threading 3, thereby having a larger diameter than the root of the threads close to the threading 3. Alternatively, said bottom may be located in the extension of the thread roots of the threading 3. The groove 9 may thus act to disengage the tool for machining the threads. The groove 9 comprises a border on the threading side 3, provided in the end threads, for example with an inclination in the range 25° to 50° with respect to the axis of the coupling 11. The groove 9 has an opposite border meeting the female sealing surface 7. Said opposite border may have an inclination of the order of 20° to 60° with respect to the axis of the coupling 11, being connected thereto via fillets with suitable radii.

Between the female sealing surface 7 and the bore 5, a shoulder is provided which extends axially in a direction opposite to the female sealing surface 7 such that at the end of makeup, said shoulder tends to be pressed against the nose of the male portion against the female sealing surface 7. The shoulder forms an axial abutment 13 with an inclination in the range 10° to 20° with respect to a radial plane. The angle formed between the female sealing surface 7 and the axial abutment 13 may be of the order of 80° to 100°. The female sealing surface 7 joins up with the shoulder via a connecting fillet. A connecting fillet connects the axial abutment 13 and the bore 5.

The male tubular element 2 comprises an external surface 10 formed between the male sealing surface 8 and the threading 4. The external surface 10 is located substantially in the extension of the thread roots of the threading 4. The external surface 10 is tapered at an inclination of the order of 1° to 5°, for example approximately 2°. In the made up condition, the external surface 10 faces the groove 9.

The male tubular element 2 extends radially inwardly beyond the male sealing surface 8 by means of a male axial abutment 14 provided in order to come into contact with the female axial abutment 13. The axial abutment 14 has an angle of 10° to 20° with respect to a radial plane. The axial abutment 14 is inclined at approximately 80° to 100° with respect to the male sealing surface 8. Between the bore 6 and the axial abutment 14, here the male tubular element 2 comprises a tapered chamfer with an inclination in the range 5° to 15°, for example 10°, with respect to the axis of the tube 12.

Fillets are provided between the various tapered surfaces. In a particular embodiment, the male sealing surface 8 is dished with a large radius of curvature, for example in the range 100 to 300 mm, providing an excellent seal with the female sealing surface 7 with a tapered form, with which a metal-metal contact is established in the made up condition.

The threaded tubular connection comprises an external seal, disposed radially outwardly of the threadings 3 and 4. The female tubular element 1 comprises an external female sealing surface 15. The male tubular element 2 comprises a male sealing surface 16 with a form that matches the sealing surface 15 to provide a seal by metal-metal contact in the made up condition of the threaded tubular connection. The female sealing surface 15 is disposed between the threading 3 and the free end of the female tubular element 1. The female sealing surface 15 may be tapered with an inclination in the range 35% to 60%, for example 50%, or dished with a large radius, for example in the range 100 to 300 mm while having a mean inclination of the order of 35% to 60%, for example 50% with respect to the axis of the coupling 11. Between the female sealing surface 15 and the threading 3 is a substantially cylindrical internal surface 17.

The threading 3 is formed from the end of the cylindrical surface 17 opposite to the sealing surface 15. Close to the internal surface 17, the thread roots follow a generatrix inclined at an angle in the range 5° to 10° with respect to the axis of the coupling 11. The thread crests are tangential to the surface 17 and thus are themselves cylindrical, thereby forming one or more imperfect threads until the nominal depth of the threads is reached. At a distance from the internal surface 17, the inclination of the thread roots reverses, parallel to the general inclination of the threading 3. In order to increase the number of perfect threads (complete, at full depth), a projection 3a may be provided, see FIG. 3. The projection 3a forms an inwardly directed shoulder of the threading 3. The projection 3a is disposed in the axial proximity of the change of inclination of the thread roots.

On the side of the sealing surface 15 opposite to the cylindrical surface 17, the female tubular element 1 comprises a radius for engaging the external sealing surface extending the sealing surface 15 and forming a dished surface 19. The dished surface 19 may have a radius of curvature in the range 0.5 to 3 mm, for example of the order of 1 mm.

The dished surface 19 is extended radially outwardly by a substantially radial surface 21. The substantially radial surface 21 extends over a distance of the order of 1 to 3 mm.

The dished surface 19 and the substantially radial surface 21 form a transition region to connect to the sealing surface 15. Said transition region may be viewed as comprising a portion in the form of a part toroid and a substantially radial portion.

The female tubular element 1 comprises an external surface 23 with a generally cylindrical form. The external surface 23 extends substantially the same distance on the female tubular element 1, taken in the axial direction with respect to the axis of the coupling 11, as the sealing surface 15 and the internal surface 17. In practice, the cylindrical external surface 23 extends axially beyond the internal surface 17, up to the zone of the perfect threads of the threading 3.

On the opposite side, the external surface 23 extends substantially to a radial plane comprising the radial surface 21. The female tubular element 1 comprises a free end in the form of an annular radial surface 25. The radial surface 25 is defined by a small diameter which is larger than the largest diameter of the male sealing surface 16. The end surface 25 connects to the external surface 23 via an external tapered chamfer 27. The external chamfer 27 may have an inclination of the order of 60° to 80° with respect to a radial plane, for example of the order of 70°.

An internal chamfer 29 is provided between the end surface 25 and the radial surface 21. The internal chamfer 29 may have an inclination of the order of 60° to 80° with respect to a radial plane, for example of the order of 70°. The internal chamfer 29 and the radial surface 21 form an annular groove 31, as can be seen in FIG. 3. The internal chamfer 29 and the radial surface 21 form a concavity in an axial sectional view. Said concavity is essentially defined by the two straight segments formed outwardly by the chamfer 29 and inwardly by the radial surface 21. The angle between the internal chamfer 29 and the radial surface 21 is less than 160°, for example of the order of 100° to 120°. The groove 31 is V-shaped with a rounded bottom. The female sealing surface 15 has a mean inclination which is less than the inclination of said chamfer 29. Preferably, the difference in inclination is at least 10%, expressed as a percentage of the inclination.

The chamfers 27 and 29 occupy a limited space in the radial direction in order to preserve a substantial cross section of material for the bumper. The total radial dimension of the chamfers 27 and 29 is less than 50% of the radial dimension of the female component at the end of the chamfers opposite to said free end, i.e. in the radial plane defined by the radial surface 21. The cumulative radial dimension of the chamfers 27 and 29 and of the end surface 25 is at least 80% of the maximum radial dimension of the female tubular element 1 beyond the perfect threads of the threading 3 in the direction of the end, in other words of the nose of the female tubular element 1.

The end surface 25 is offset axially with respect to the radial surface 21 by a distance L of the order of 1 to 5 mm, for example of the order of 2 mm. The distance L is less than 25% of the nominal external diameter of the component. The radial surface 21 and the dished surface 19 offer a radial offset between the internal chamfer 29 and the female sealing surface 15 of more than 1.5 mm, of the order of 2 mm. The female sealing surface 15 is protected by the end surface 25 which is in front with respect to the radial plane of the radial surface 21. The end surface 25 which is in front thus forms a bumper, especially against manipulation shocks before the threaded connection is made up. If dropped onto a flat surface, the end surface 25 will bear first and could possibly be deformed, while retaining the integrity of the sealing surface 15, in particular as regards its dimensions.

Thus, a removable cap which wastes time and generates waste can be dispensed with.

The Applicant has observed that the larger the distance L, the more the contact of the metal-metal sealing surfaces 15 and 16 is offset towards the free end 25 of the female component. In fact, the larger the axial distance L, the greater the radial rigidity close to the free end 25 of the female component. For this reason, the interference zone of the metal-metal sealing surfaces 15 and 16 is offset towards the free end 25 of the female component. It is desirable to limit the axial distance L such that the contact of the metal-metal sealing surfaces 15 and 16 is outside the groove. In the example, the optimum value of L calculated by finite element analysis is approximately 2 mm.

The parameters (radii, inclinations, forms, etc) of the sealing surfaces 15 and 16 are adapted as a function of the axial distance L in order to obtain an optimum stable contact.

During makeup, the female sealing surface 15 will gradually come into tightening contact with the male sealing surface 16 to form a seal by metal-metal contact. The female sealing surface 15 tends to become deformed by increasing the diameter in the elastic domain. This possible increase in diameter is countered by the rigidity of the nose of the female tubular element 1, and the rigidity is increased by the presence of a ring of supplemental material defined by the radial plane of the radial surface 21, the end surface 25 and the chamfers 27 and 29. This ring of supplemental material significantly increases the force needed to increase the diameter of the sealing surface 15 and hence correspondingly increases the contact forces between the sealing surfaces 15 and 16. Thus, the material of the female tubular element 1 beyond the radial plane of the radial surface 21 has a double function as a bumper and, because of its annular form, as a stiffener against outward radial deformation of the sealing surface 15.

Between the male sealing surface 16 and the threading 4, the male tubular element 2 comprises a substantially cylindrical external surface 18 from which the threads of the threading 4 gradually emerge with a zone of imperfect threads, the crest of the threads of the threading 4 having a diameter less than or equal to the diameter of the external cylindrical surface 18. The male tubular element 2 comprises an intermediate surface 20 disposed on the side of the sealing surface 16 opposite to the cylindrical surface 18. The intermediate surface 20 is short, for example in the range 2 to 10 mm. The intermediate surface 20 is preferably cylindrical for reasons of simplicity, but it may be very slightly tapered with an inclination less than the inclination of the tapered bearing surfaces 16 and 22. Beyond the intermediate surface 20 there is a tapered surface 22 extending between the intermediate surface 20 and the external surface 24 defining the nominal external diameter of the tube 12. The tapered surface 22 may have an inclination of the order of 40% to 60% with respect to the axis of the male tubular element 2, for example equal to the inclination of the sealing surface 16.

The profile of the male portion of the external sealing surface, illustrated in more detail in FIG. 4, proves to be advantageous because of the staging of the tapered sealing surfaces formed on the one hand by the sealing surface 16 and on the other hand by the external tapered surface 22 forming a ramp. For reasons of simplicity when machining, it is advantageous to provide the two tapered bearing surfaces with the same inclination. One of the difficulties during machining arises from defects in the external surface 24. The external surface 24 is nominally a surface of revolution. The external surface 24 of an actual tube deviates slightly from a perfect circle, viewed in cross section. However, the sealing surface 16 is machined very accurately, while the external surface 24 is forged with larger tolerances by at least one order of magnitude. The sealing surface 16 must be a surface of revolution with precise, reliable tolerances.

The presence of the intermediate surface 20 and of the external tapered surface 22 means that the machining can be inspected visually, either by an operator or by an image capture and processing system. If the defect is slight, the tapered surface 22 will only be partially machined or even not machined at all. It suffices to check that the intermediate surface 20 has indeed been machined in order to be certain that the sealing surface 16 has also been completely machined. The intermediate surface 20 forms an inspection surface. Since large dimension tubes are particularly subject to defects, in particular to ovalization or having too small a diameter, or even a curvature, the intermediate surface 20 allows rapid and relatively certain verification of complete machining of the sealing surface 16 of the male tubular element 2.

Further, the sealing surface 16 may be in accordance with patent FR 2 868 146; the reader is invited to refer thereto. The sealing surface 16 may undulate in a series of rounded annular ribs coming into contact with the sealing surface 15 facing it in the made up condition. The sealing surface 15 is smooth.

In FIG. 1, the external surface 23 close to the end of the coupling connects to the maximum diameter external surface 33 of the coupling via an annular groove 35 also termed the "crescent" obtained by removing material, also termed "slimming" in the zone between the external surfaces 23 and 33. Thus, the flexibility of the coupling can be increased axially at the threading 3 while preserving a high radial rigidity axially at the sealing surface 15. The reader is invited to refer to document FR 2 807 095.

The annular groove 35 may have a border close to the external surface 23 inclined at approximately 10° to 30°, for example 20° with respect to the axis of the coupling, a substantially cylindrical bottom and a border close to the large diameter external surface 33 with two slopes, a shallow inclination close to the bottom and a steep inclination close to the external surface 33. The shallow inclination may be inclined at an angle of the order of 5° to 15°, for example approximately 10° with respect to the axis of the coupling. The steep inclination may be inclined at an angle of the order of 30° to 50°, for example approximately 45° with respect to the axis of the coupling. The annular groove 35 is located axially at the location of the perfect threads of the threading 3 while remaining at a distance from the end of the threading 3 close to the internal sealing surface 7. A low thickness zone perpendicular to the female threading 3 and a high thickness zone perpendicular to the female sealing surface 15 are obtained. The low thickness zone extends over a portion of the length of the female threading 3.

The threadings 3 and 4 are self-locking in the radial direction, see FIG. 5. In the case of a tensile load, the counter-inclination of the stabbing flanks tends to re-tighten the female tubular element 1 on the male tubular element 2. The contact pressure of the female sealing surfaces 7 and 15 on the male sealing surfaces 8 and 16 is increased.

As illustrated in FIG. 5, the threadings 3 and 4 comprise roots and crests that are generally smooth, following the taper of said threadings 3 and 4. The stabbing flanks 51 and 52 have an angle in the range +1° to +5° in the trigonometric sense, for example approximately 3°. The load flanks 53 and 54 have an angle in the range −5° to −35° in the trigonometric sense, for example approximately −25°. The join between the root, the crest, the load flank and the stabbing flank is made via fillets with two radii. The large radius is 2 to 3 times greater than the small radius. The small radius is close to the flank, while the large radius is close to the root or the crest. The stresses are less concentrated, hence enhanced fatigue strength.

The invention claimed is:

1. A female component for a tubular hydrocarbon working string subjected to dynamic bending strength, the female component having a longitudinal axis and comprising:
   a tapered female threading for cooperation with a male threading to form a rigid mutual connection of tubular elements, a free end, and a female sealing surface being disposed between the free end and the tapered female threading, the female sealing surface configured to come into contact in a made up condition with a male sealing surface to form a metal-to-metal seal;
   an annular groove provided between the free end and the female sealing surface, leaving an axial distance greater than zero between the free end and an outward transition region of the female sealing surface, and a radial distance greater than zero between the female sealing surface and a chamfer of the free end, the annular groove comprising a border formed by the chamfer and a border formed by a portion of the transition region, to protect the female sealing surface prior to makeup; and
   a low thickness zone at the tapered female threading and a high thickness zone at the female sealing surface, the low thickness zone extending over a portion of a length of the tapered female threading and being obtained by providing a concavity in axial section from an external surface of the female component.

2. The female component according to claim 1, further comprising an internal abutment surface disposed close to the tapered female threading on a side opposite to the free end.

3. The female component according to claim 1, in which the chamfer is tapered at an angle in a range of 10° to 30°.

4. The female component according to claim 1, in which the free end comprises a surface orientated substantially radially.

5. The female component according to claim 1, in which the annular groove has a concavity with an angle of less than 160° in section along a plane passing through an axial section thereof.

6. The female component according to claim 1, in which the portion of the transition region is substantially radial.

7. The female component according to claim 1, in which the portion of the transition region is in a general form of a circular arc in axial section and the female sealing surface is in a general form of a circular arc in axial section, a radius of the female sealing surface being more than 150 mm, or a radius of the female sealing surface is more than at least 10 times a radius of the portion of the transition region.

8. The female component according to claim 1, in which the portion of the transition region is in a general form of a circular arc in axial section and the female sealing surface is tapered.

9. The female component according to claim 1, in which the female sealing surface has a mean inclination that is less than an inclination of the chamfer, or is less by at least 10%.

10. The female component according to claim 1, in which, the female sealing surface has a mean inclination of more than 35%.

11. The female component according to claim 1, in which the axial distance between the free end and the outward transition region of the female sealing surface is greater than 1 mm and less than 25% of a nominal exterior diameter of the component, and the radial distance between the female sealing surface and the chamfer of the free end is more than 1.5 mm.

12. The female component according to claim 1, in which the tapered female threading comprises roots, crests, load flanks, and stabbing flanks connected via fillets with two radii of curvature, a large radius of curvature close to the roots and crests and a small radius of curvature close to the load flanks and the stabbing flanks.

13. A process for obtaining a female component according to claim 1, comprising selecting a location of maximum pressure to which the female sealing surface in contact with the ale sealing surface is subjected, as a function of the axial distance between the free end and the outward transition region of the female sealing surface.

14. A threaded connection, comprising:
a female component according to claim 1 and a male component comprising a tapered male threading, a male sealing surface, and an external cylindrical surface, the male sealing surface being disposed between the tapered male threading and the eater al cylindrical surface;
a ramp provided close to the external cylindrical surface; and
a cylindrical inspection surface provided between the ramp and the male sealing surface.

15. A process for obtaining a threaded connection according to claim 14, comprising inspecting the male sealing surface to verify that the cylindrical inspection surface has been machined.

16. The threaded connection according to claim 14, wherein threading of the tapered female threading and the male threading is self-locking.

* * * * *